(12) United States Patent
Reed et al.

(10) Patent No.: US 7,380,246 B2
(45) Date of Patent: May 27, 2008

(54) METHOD AND SYSTEM OF ACCESSING AT LEAST ONE TARGET FILE IN A COMPUTER SYSTEM WITH AN OPERATING SYSTEM WITH FILE LOCKING IMPLEMENTED WITH BYTE-RANGE LOCKING

(75) Inventors: Benjamin C. Reed, Morgan Hill, CA (US); Mark A. Smith, Los Gatos, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 653 days.

(21) Appl. No.: 10/736,825

(22) Filed: Dec. 15, 2003

(65) Prior Publication Data

US 2005/0132185 A1   Jun. 16, 2005

(51) Int. Cl.
*G06F 9/455* (2006.01)
*G06F 9/46* (2006.01)

(52) U.S. Cl. .......................... 718/100; 707/8; 713/164
(58) Field of Classification Search ........ 713/164–167; 707/8–10
See application file for complete search history.

(56) References Cited

U.S. PATENT DOCUMENTS

| 4,918,653 | A | * | 4/1990 | Johri et al. ................ 726/23 |
| 5,623,666 | A | * | 4/1997 | Pike et al. ................ 707/200 |
| 5,673,394 | A | * | 9/1997 | Fenwick et al. ............ 719/312 |
| 5,675,725 | A | * | 10/1997 | Malcolm ..................... 714/6 |
| 5,689,706 | A | * | 11/1997 | Rao et al. .................... 707/201 |
| 5,734,898 | A | * | 3/1998 | He .............................. 707/203 |
| 5,761,659 | A | * | 6/1998 | Bertoni .......................... 707/8 |
| 5,873,118 | A | * | 2/1999 | Letwin ....................... 711/156 |
| 6,026,474 | A | * | 2/2000 | Carter et al. ................ 711/202 |
| 6,161,111 | A | * | 12/2000 | Mutalik et al. ............. 707/205 |
| 6,356,863 | B1 | * | 3/2002 | Sayle ........................... 703/27 |

(Continued)

OTHER PUBLICATIONS

OSR Online List. Tom Hansen. RE: Can I read locked file?. Oct. 22, 2002. http://www.osronline.com/showThread.cfm?link=35605 pp. 1-5.*

(Continued)

*Primary Examiner*—Matthew Heneghan
*Assistant Examiner*—Nicole M Young
(74) *Attorney, Agent, or Firm*—Anthony M. Del Zoppo, III; Driggs, Hogg, Daugherty & Del Zoppo Co., LPA (57) ABSTRACT

The present invention provides a method and system of accessing at least one target file in a computer system with an operating system with file locking implemented with byte-range locking. In an exemplary embodiment, the method and system include obtaining a set of handles that corresponds to a set of all files that are open in the computer system, determining within the kernel of the operating system a set of file identifiers that corresponds to the set of handles, identifying from the set of file identifiers a file identifier that corresponds to the target file, sending the identified file identifier to the kernel, initializing within the kernel file caching for the identified file identifier, and requesting within the kernel the cache manager of the operating system to obtain by using the identified file identifier a region of the target file from the file system driver of the operating system.

36 Claims, 11 Drawing Sheets

U.S. PATENT DOCUMENTS

| | | | |
|---|---|---|---|
| 6,389,427 B1 * | 5/2002 | Faulkner | 707/104.1 |
| 6,401,093 B1 * | 6/2002 | Anand et al. | 707/10 |
| 6,510,499 B1 * | 1/2003 | Aaker | 711/154 |
| 6,513,051 B1 * | 1/2003 | Bolosky et al. | 707/204 |
| 6,516,351 B2 | 2/2003 | Borr | |
| 6,654,794 B1 * | 11/2003 | French | 709/217 |
| 6,842,770 B1 * | 1/2005 | Serlet et al. | 709/203 |
| 6,952,736 B1 * | 10/2005 | Westbrook | 709/229 |
| 6,973,549 B1 * | 12/2005 | Testardi | 711/150 |
| 6,985,915 B2 * | 1/2006 | Somalwar et al. | 707/203 |
| 7,162,486 B2 * | 1/2007 | Patel et al. | 707/102 |
| 7,174,360 B2 * | 2/2007 | Uemura et al. | 709/201 |
| 7,185,013 B2 * | 2/2007 | Burnett | 707/9 |
| 7,281,168 B1 * | 10/2007 | Coates et al. | 714/43 |
| 2002/0019874 A1 | 2/2002 | Borr | |
| 2002/0055923 A1 | 5/2002 | Kupfer | |
| 2002/0078239 A1 * | 6/2002 | Howard et al. | 709/245 |
| 2002/0078244 A1 * | 6/2002 | Howard | 709/248 |
| 2002/0138664 A1 * | 9/2002 | Blott et al. | 709/328 |
| 2003/0053102 A1 * | 3/2003 | Kelsey | 358/1.13 |
| 2003/0065796 A1 | 4/2003 | Borr | |
| 2003/0200193 A1 * | 10/2003 | Boucher | 707/1 |
| 2003/0229609 A1 * | 12/2003 | Haugh | 707/1 |
| 2004/0255048 A1 * | 12/2004 | Lev Ran et al. | 709/249 |

OTHER PUBLICATIONS

OSR Open Systems Resources, Inc. Frequently Asked Questions on Windows 2000 Installable File Systems. Aug. 4, 2002. http://web.archive.org/web/20020804164138/http://www.osr.com/resources_ifsfaq.shtml pp. 1-57.*

J. Heidemann, G. Popek. Performace of Cache Coherence in Stackable Filing. ACM SIGOPS Operating Systems Review, Proceedings of the fifteenth ACM symposium on Operating systems principles SOSP. vol. 29 Issue 5. Dec. 1995. http://portal.acm.org/results.cfm?coll=ACM&dl=ACM&CFID=3489846 &CFTOKEN=36796228 pp. 127-142.*

Distributed Program Construction. Lecture 2: Intro to Design of Dist. Systems. http://www.cs.rice.edu/~druschel/comp413/lectures/design.html Fall 2002. pp. 1-11.*

[OpenAFS-devel] afs adn byte-range locking ideas Dec. 4, 2001 https://lists.openafs.org/pipermail/openafs-devel/2001-December/002221.html.

Exclusive File Access in Mac OS X—Technical Note TN2037 Exclusive File Access in Mac OS X—http://developer.apple.com/technotes/tn/tn2037.html p. 1-8 May 1, 2002.

Lock Em Up—Byte Range Locking, 2002 OSR Open Systems Resources, Inc.—http://www.osr.com/ntinsider/2002/byterange/byterange.htm 2002 p. 1-6.

SecureShare (PDF) Safe UNIX/Windows File Sharing Through Mulitprotocol Locking—www.connectathon.org/talks98/borr.pdf p.1-16 Mar. 10, 1998.

Jun Hu, DCE/DFS UMIACS University of Maryland, pp. 1-11, no date.

NEX v4 Mailing List Archive: 1998: RE: Locking and Sharing: http://playground.sun.com/pub/nfsv4/nfsv4-wg-archive/1998/0178.html 1998, p. 1-3.

Distributed File System: Design Comparisons II, Pei Cao, Cisco Systems, Inc., no date.

LockFile Ex (Storage: Patform SDK)—pp. 1-3http://msdn.microsoft.com/library/en-us/fileio/base/lockfileex.asp?frame=true 2003.

Network Appliance—SecureShare: Guaranteed Multiprotocol File Locking [TR 3024] http://www.netapp.com/tech_library/3024.html, pp. 1-19, Aug. 15, 2002.

42nd IETF, NFSv4 Strawman, pp. 1-19, no date.

DCE 2.2 NFS to DFS Authenticating Gateway—pp. 1-4. http://www-3.ibm.com/software/network/dce/library/publicatins/dceaix_22/a3u2t/A3U2T, no date.

7.10 File Locking in AFS http://www.final.gov/docs/UNIX/unixx_at _fermilab/htmldoc/rev1997/uatf-55.html Apr. 10, 1998.

NFS: Hunting for a Cross-Platform File System, http://www.networkcomputing.com/912/912buyers2.html, pp. 1-4 2003.

w3c-dist-authEw3.org from Jan. to Mar. 1997: Re: Range locking not used in group . . . http://lists.w3.org/Archives/Public/w3c-dist-auth/1997 JanMar/0179.html, pp. 1-3 1997.

Chapter 14. File and Record Locking http://us3.samba.org/samb/devel/docs/html/locking.html, p.-16, no date, p. 1-16.

Technology Spotlight—Network Data Sharing for Windows and UNIX Clients, pp. 1-9 Apr. 30, 2001.

Pair Networks—Current Topics—Insider Newsletter—Coding Tips, http://www.pair.com/pair/current/insider/0702/coding.html, pp. 1-1 Jul. 2002.

Microsoft Knowledge Base Article—129202, PC Ext: Explanation of Opportunistic Locking on Windows NT, pp. 1-3—http://support.microsoft.com/default.aspx?scid= Mar. 11, 2003.

NFS v4 Mailing List Archive: 1998: Re: Alternative Locking Prop, http://playround.sun.com/pub/nfsv4/nfsv4-wg-archive/1998/0425.html pp. 1-3-Apr. 25, 1998.

129202—PC Ext: Explanation of Opportunistic Locking on windows NT, pp. 1-2, http://support.microsoft.com/default.aspx?scid=KB;en-us;q129202 Mar. 11, 2003.

Slashdot/ Open File Locking and Mac OS X?, pp. 1-11 http://apple.slashdot.org/apple/03/02/21/0919220.shtml?tid=179 Feb. 21, 2003.

Frederick, Dale—Flexible File Management, pp. 1-4 http://www.basis.com//mag-v3n3/flexfiles.html 1999.

[LeapList]File Open Problem, pp. 1-3 http://lists.leap-cf.org/pipermail/leaplist/2002-October/024342.html Oct. 3, 2002.

File Locking, pp. 1—http://lists.swau.edu/pipermail/pwerh-1/1999-October/003019.html Oct. 4, 1999.

http://starship.python.net/crew/jjkunce/python/ntposixfile.py, pp. 1-5 Jun. 1998.

WEB FS.com—Web Feature Brief—Client Catching & Lock Management no date, p. 1-5.

* cited by examiner

METHOD AND SYSTEM OF ACCESSING AT LEAST ONE TARGET FILE IN A COMPUTER SYSTEM WITH AN OPERATING SYSTEM WITH FILE LOCKING IMPLEMENTED WITH BYTE-RANGE LOCKING

RELATED APPLICATIONS

The present application is related to U.S. patent application Ser. No. 10/737,581, filed Dec. 15, 2003.

FIELD OF THE INVENTION

The present invention relates to operating systems, and particularly relates to a method and system of accessing at least one target file in a computer system with an operating system with file locking implemented with byte-range locking.

BACKGROUND OF THE INVENTION

The Microsoft Windows® (hereinafter "Windows") kernel and Windows® programs have the ability to protect certain byte ranges in files from being read by other processes. This is done by opening a file and then issuing a lock command on the byte range this process would like to protect.

As long as this process holds the file open, other processes are subject to the locks held by this process. Attempts to read such a file by other processes will result in Windows® "lock violations", and the data in the specified byte ranges in the file cannot be read.

Need to Access Locked Files

However, the data in these files can be extremely important to many applications, especially backup applications. For example, it is important for backup applications to be able to read and backup every file on a machine. In addition, some of these protected files are files containing Windows® registry information and are therefore necessary for the correct operation of a restored backup image.

Prior Art Systems

Currently, backup applications take one of two approaches to get around this problem.

Sector-Wise Copy

Figure 1A:
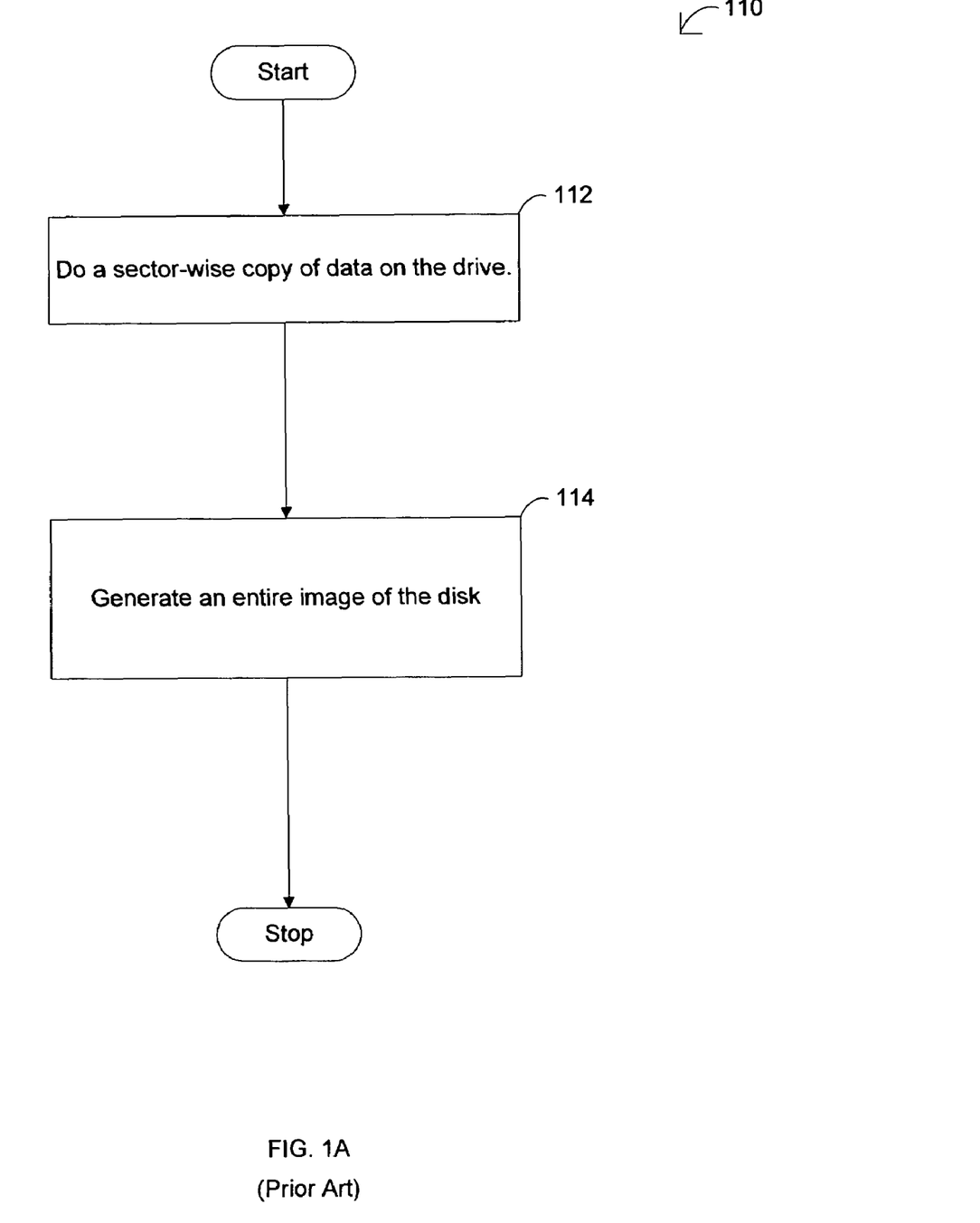
FIG. 1A is a flowchart of a prior art technique.

In the first prior art approach, as shown in prior art FIG. 1A, an application would (1) do a sector-wise copy of data on the drive, as step 112, and (2) generate an entire image of the disk, as step 114. Unfortunately, this method produces a monolithic copy of the drive. In addition, this technique produces a disk image in which it is difficult to locate the sectors of an individual file. This makes a "single file restore" from this image very difficult.

Figure 1B:
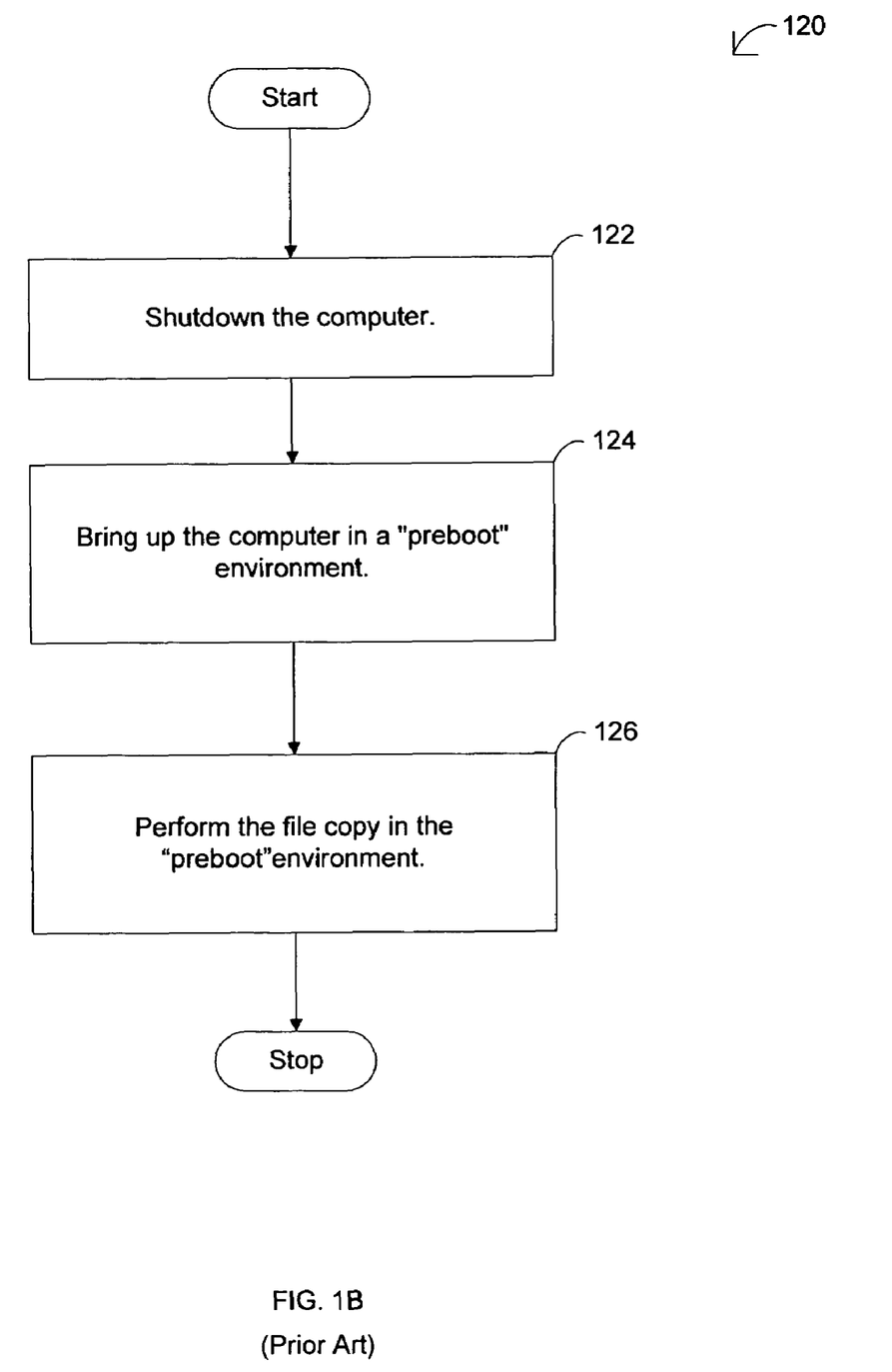
FIG. 1B is a flowchart of a prior art technique.

The second prior art approach that applications use, as shown in prior art FIG. 1B, is to (1) shutdown the machine, as step 122, and (2) bring it up in a "preboot" environment, as step 124, where the (3) file copy can be performed, as step 126. The machine is either rebooted again, or finishes booting to Windows®. This method is poor because it requires a reboot to be able to copy these files. In addition, a backup while the machine is running is impossible.

Therefore, a method and system of accessing at least one target file in a computer system with an operating system with file locking implemented with byte-range locking is needed.

SUMMARY OF THE INVENTION

The present invention provides a method and system of accessing at least one target file in a computer system with an operating system with file locking implemented with byte-range locking. In an exemplary embodiment, the method and system include (1) obtaining a set of handles that corresponds to a set of all files that are open in the computer system, (2) determining within the kernel of the operating system a set of file identifiers that corresponds to the set of handles, (3) identifying from the set of file identifiers a file identifier that corresponds to the target file, (4) sending the identified file identifier to the kernel, (5) initializing within the kernel file caching for the identified file identifier, (6) requesting within the kernel the cache manager of the operating system to obtain by using the identified file identifier a region of the target file from the file system driver of the operating system, and (7) receiving from the cache manager data that corresponds to the target file.

In an exemplary embodiment, the obtaining includes (a) issuing an NtQuerySystemInformation to the kernel, where the NtQuerySystemInformation asks for all information about each handle in the set of handles, and (b) obtaining from the kernel an array of SYSTEM_HANDLE_INFORMATION for each handle in the set of handles, where the SYSTEM_HANDLE_INFORMATION includes a pointer to a FILE_OBJECT, where the FILE_OBJECT includes file identifier information.

In an exemplary embodiment, the determining includes, for each handle in the set of handles, passing a pointer to the FILE_OBJECT corresponding to the each handle to the kernel. In a further embodiment, the determining includes, for the each handle in the set of handles, outputting from within the kernel a file identifier corresponding to the passed FILE_OBJECT.

In an exemplary embodiment, the identifying includes identifying the FILE_OBJECT corresponding to the identified file identifier that corresponds to the target file. In an exemplary embodiment, the sending includes (a) passing the identified FILE_OBJECT to the kernel and (b) requesting from the kernel a reading of data from the target file corresponding to the identified FILE_OBJECT via a cache read.

In an exemplary embodiment, the initializing includes (a) checking within the kernel the identified FILE_OBJECT for an existing cache map and (b) if the existing cache map does not exist, creating a cache map for the identified FILE_OBJECT by using CcInitializeCacheMap. In an exemplary embodiment, the requesting includes issuing the cache read for the identified FILE_OBJECT through CcMdlRead. In an exemplary embodiment, the receiving includes receiving from the kernel the data that corresponds to the target file.

In an exemplary embodiment, the method and system include (1) obtaining a set of handles that corresponds to a set of all files that are open in the computer system, (2) determining within the kernel of the operating system a set of file identifiers that corresponds to the set of handles, (3) identifying from the set of file identifiers a file identifier that corresponds to the target file, (4) sending the identified file identifier to the kernel, (5) initializing within the kernel file caching for the identified file identifier, and (6) requesting within the kernel the cache manager of the operating system to obtain by using the identified file identifier a region of the target file from the file system driver of the operating system.

The present invention also provides a computer program product usable with a programmable computer having readable program code embodied therein of accessing at least one target file in a computer system with an operating system with file locking implemented with byte-range locking. In an exemplary embodiment, the computer program product includes (1) computer readable code for obtaining a set of handles that corresponds to a set of all files that are open in the computer system, (2) computer readable code for determining within the kernel of the operating system a set of file identifiers that corresponds to the set of handles, (3) computer readable code for identifying from the set of file identifiers a file identifier that corresponds to the target file, (4) computer readable code for sending the identified file identifier to the kernel, (5) computer readable code for initializing within the kernel file caching for the identified file identifier, (6) computer readable code for requesting within the kernel the cache manager of the operating system to obtain by using the identified file identifier a region of the target file from the file system driver of the operating system, and (7) computer readable code for receiving from the cache manager data that corresponds to the target file.

DETAILED DESCRIPTION OF THE INVENTION

The present invention provides method and system of accessing at least one target file in a computer system with an operating system with file locking implemented with byte-range locking. In an exemplary embodiment, the present invention provides a method and system of reading data in Windows® files with byte range locks while Windows® remains running. In an exemplary embodiment, the method and system include (1) obtaining a set of handles that corresponds to a set of all files that are open in the computer system, (2) determining within the kernel of the operating system a set of file identifiers that corresponds to the set of handles, (3) identifying from the set of file identifiers a file identifier that corresponds to the target file, (4) sending the identified file identifier to the kernel, (5) initializing within the kernel file caching for the identified file identifier, (6) requesting within the kernel the cache manager of the operating system to obtain by using the identified file identifier a region of the target file from the file system driver of the operating system, and (7) receiving from the cache manager data that corresponds to the target file.

Figure 2:
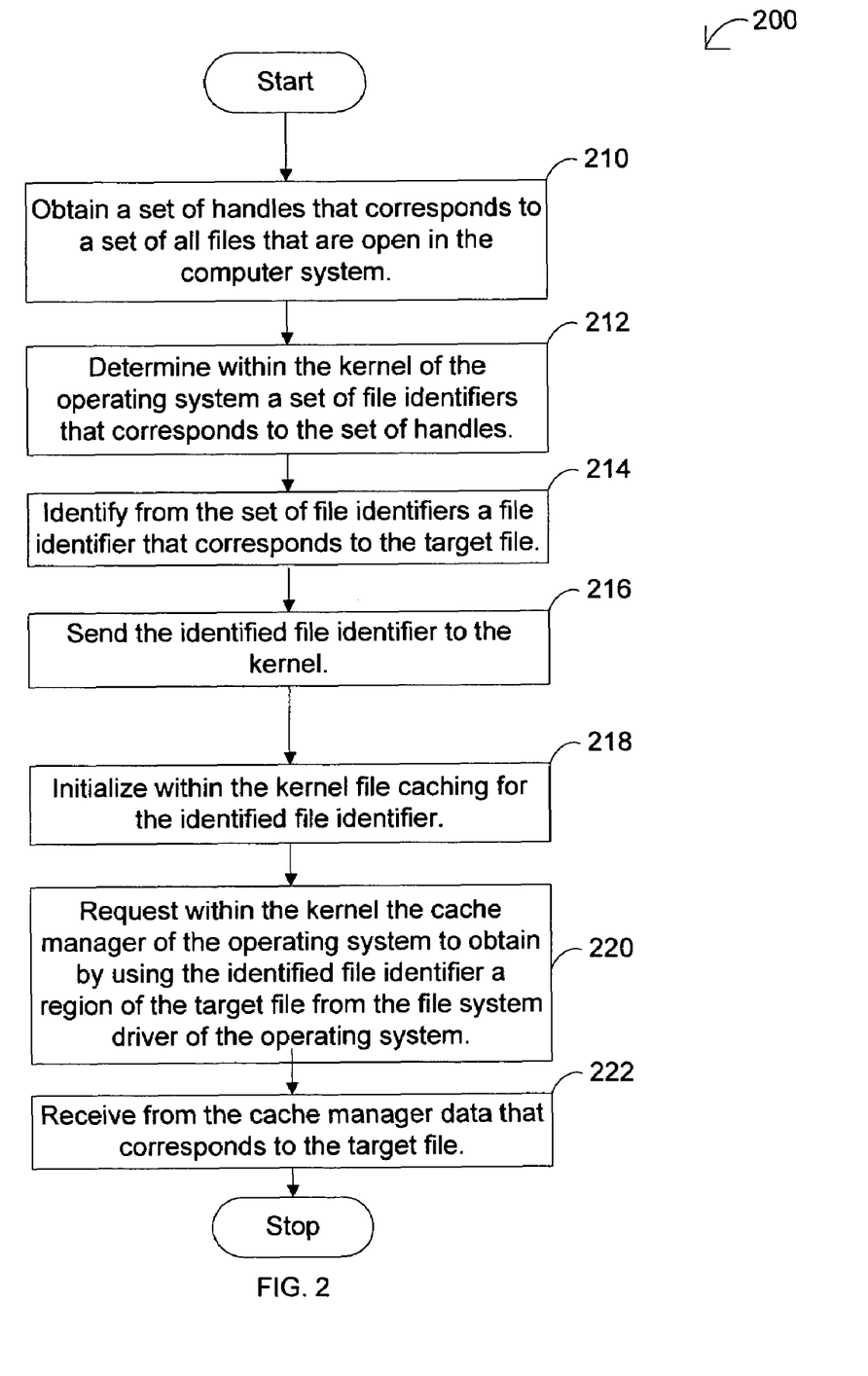
FIG. 2 is a flowchart in accordance with an exemplary embodiment of the present invention.

Referring to FIG. 2, in an exemplary embodiment, the present invention includes a step 210 of obtaining a set of handles that corresponds to a set of all files that are open in the computer system, a step 212 of determining within the kernel of the operating system a set of file identifiers that corresponds to the set of handles, a step 214 of identifying from the set of file identifiers a file identifier that corresponds to the target file, a step 216 of sending the identified file identifier to the kernel, a step 218 of initializing within the kernel file caching for the identified file identifier, a step 220 of requesting within the kernel the cache manager of the operating system to obtain by using the identified file identifier a region of the target file from the file system driver of the operating system, and a step 222 of receiving from the cache manager data that corresponds to the target file.

General

The present invention reads Windows® files with byte range locks via two programs (e.g. wam.sys and bam.exe) which work in tandem, sending data back and forth between each other. At a high level, one of these programs (e.g. wam.sys) runs in the kernel and does the actual reading, while the other program (e.g. bam.exe) runs in user space, deduces information about the file, and passes that information to the kernel program in order to give it enough information to know where to read. The kernel program then returns the read data back to the user level program.

Obtaining a Set of Handles

Specifically, the user level program issues an NtQuerySystemInformation to the kernel asking for all information about open file handles. The kernel returns an array of SYSTEM_HANDLE_INFORMATION for each open handle in the kernel.

Figure 3:
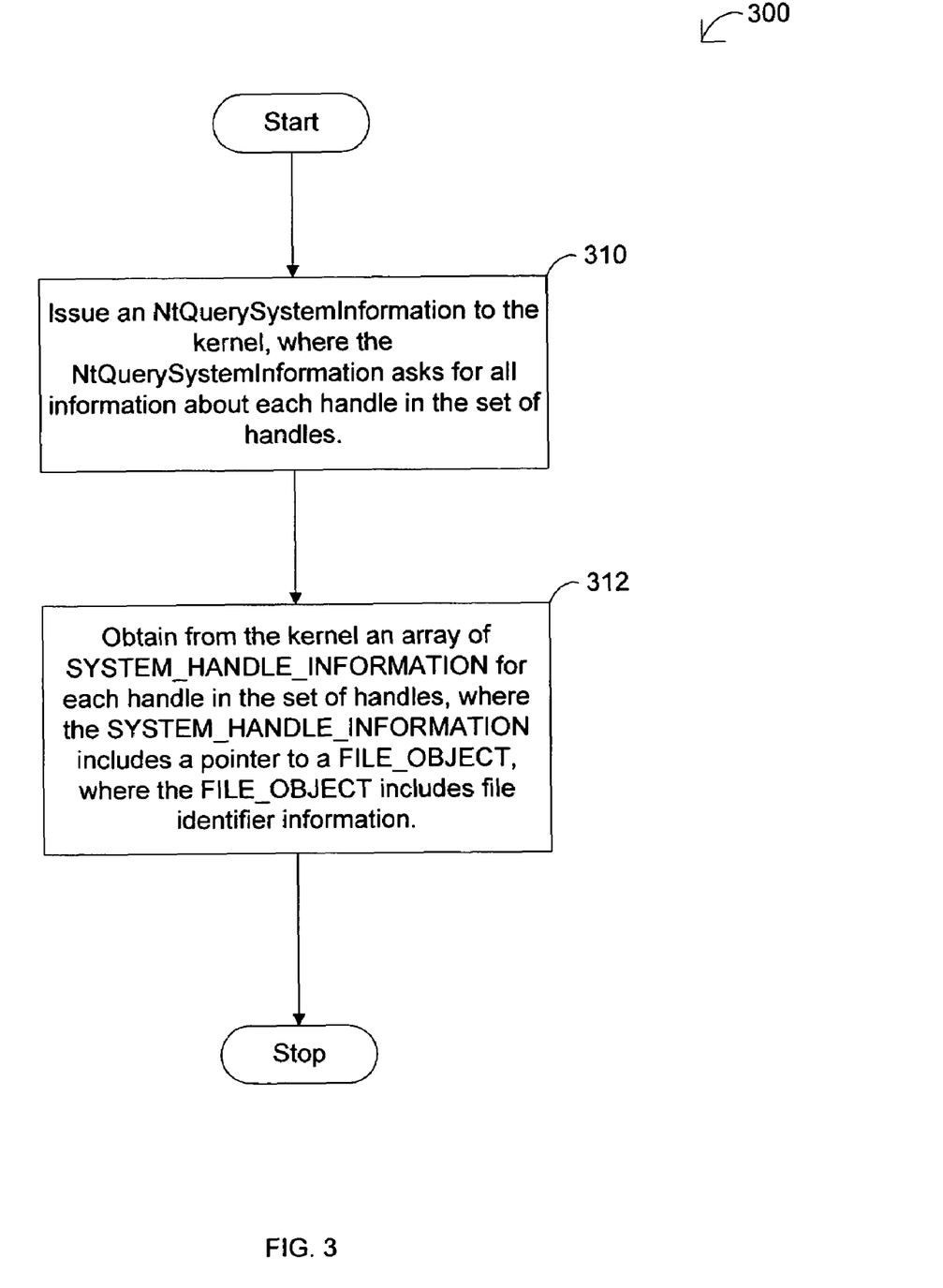
FIG. 3 is a flowchart of the obtaining step in accordance with an exemplary embodiment of the present invention.

Referring to FIG. 3, in an exemplary embodiment, obtaining step 210 includes a step 310 of issuing an NtQuerySystemInformation to the kernel, where the NtQuerySystemInformation asks for all information about each handle in the set of handles, and a step 312 of obtaining from the kernel an array of SYSTEM_HANDLE_INFORMATION for each handle in the set of handles, where the SYSTEM_HANDLE_INFORMATION includes a pointer to a FILE_OBJECT, where the FILE_OBJECT includes file identifier information.

Determining a Set of File Identifiers Corresponding to the Set of Handles

However, a correspondence between file handles and filenames is still needed. Finding out which handle is a handle for the target file is still needed. One piece of information in this SYSTEM_HANDLE_INFORMATION is a pointer to a FILE_OBJECT. FILE_OBJECTs contain filename information. However, the memory storing FILE_OBJECTs can only be used in the kernel.

Therefore, the user level program passes a pointer to this memory into the kernel level program. Then, the kernel level program passes back out the filename that this FILE_OBJECT describes.

Figure 4A:
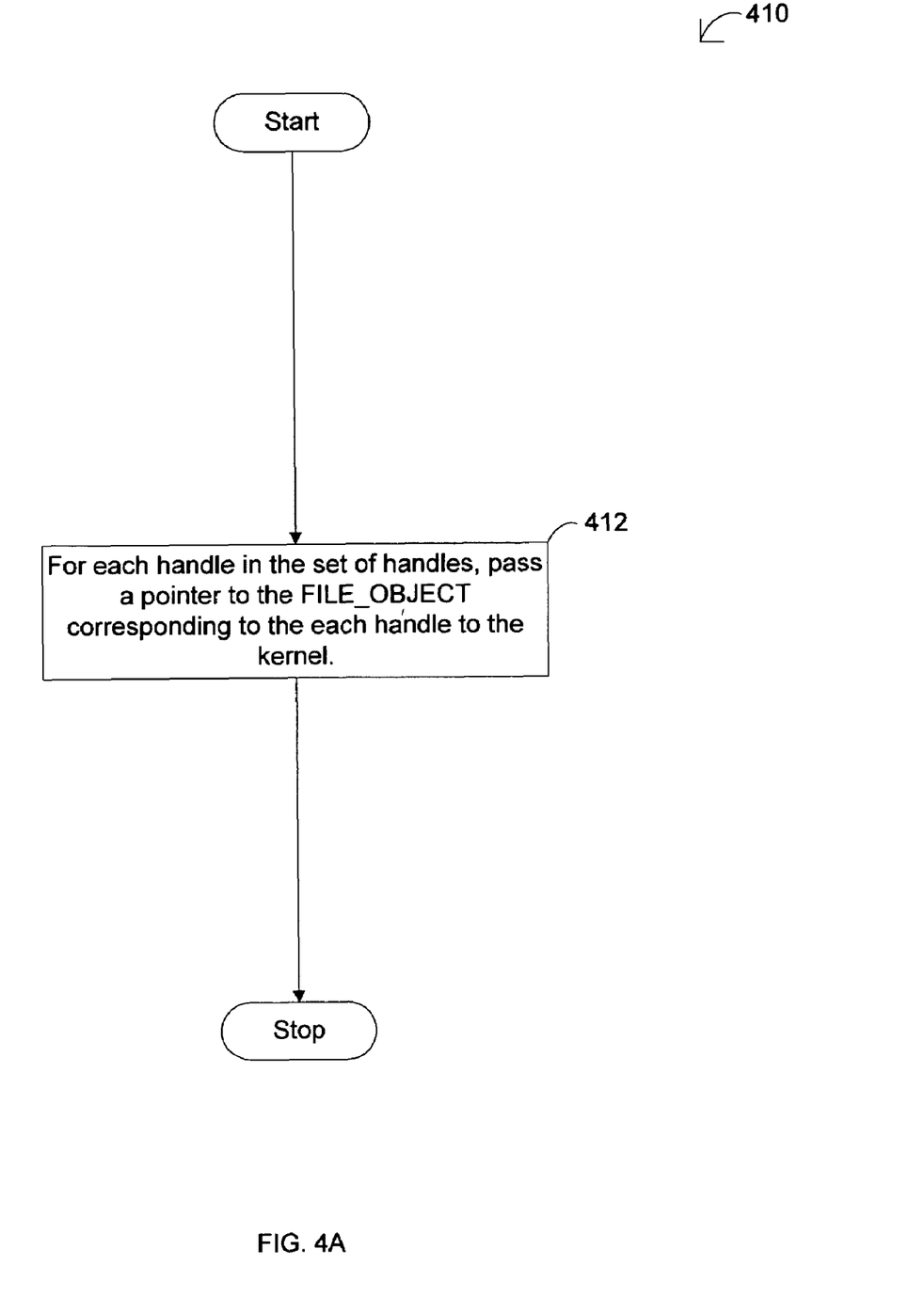
FIG. 4A is a flowchart of the determining step in accordance with an exemplary embodiment of the present invention.
Figure 4B:
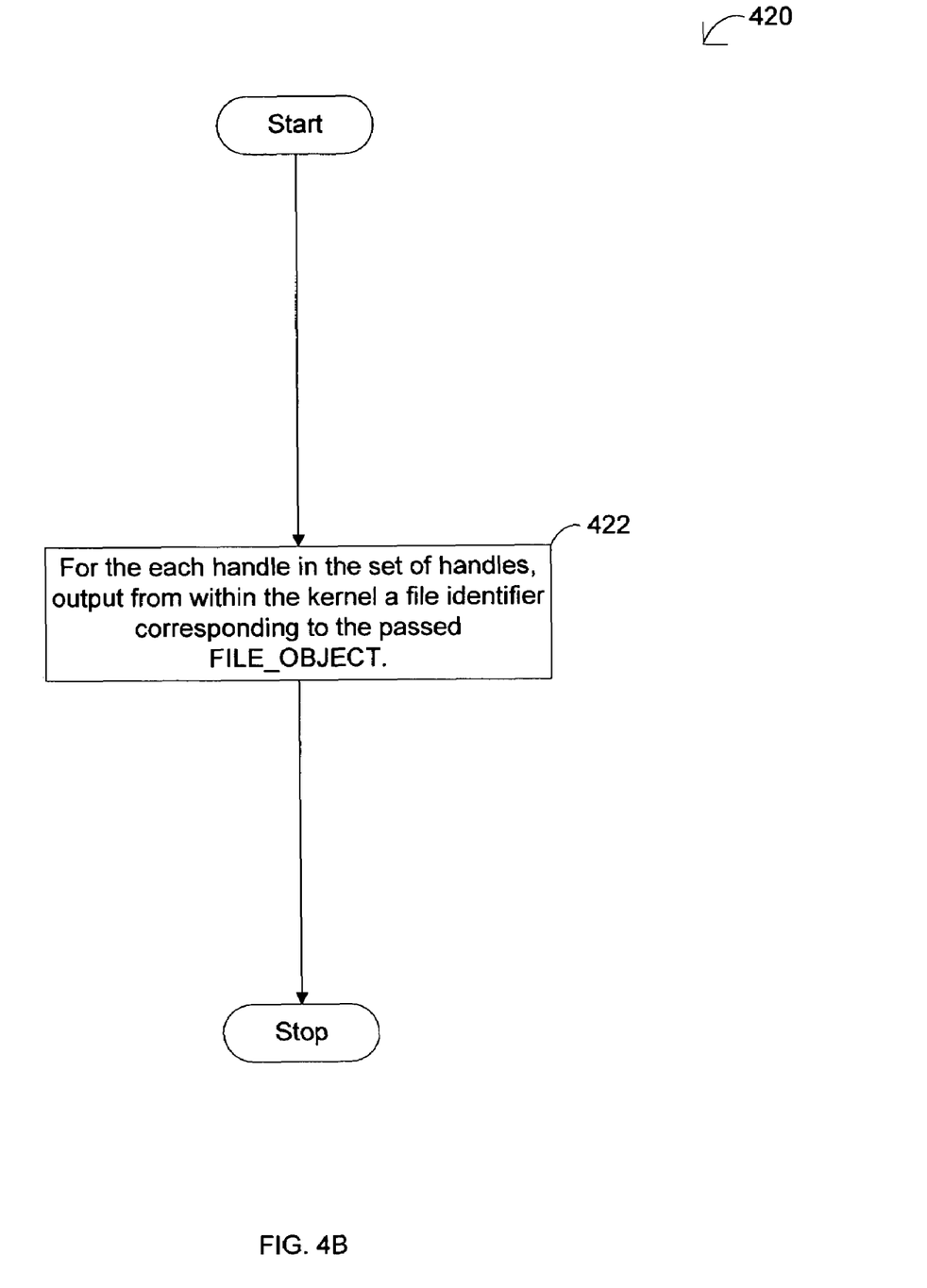
FIG. 4B is a flowchart of the determining step in accordance with a further embodiment of the present invention.

Referring to FIG. 4A, in an exemplary embodiment, determining step 212 includes a step 412 of, for each handle in the set of handles, passing a pointer to the FILE_OBJECT corresponding to the each handle to the kernel. In a further embodiment, as shown in FIG. 4B, determining step 212 further includes, for the each handle in the set of handles, a step 422 of outputting from within the kernel a file identifier corresponding to the passed FILE_OBJECT.

Identifying a File Identifier Corresponding to the Target File

The user level program continues to perform this way until the filename it is looking for is returned from the kernel. It now has a handle to the protected file, the target file, that is desired to be read. Essentially, a file open has been performed.

Figure 5:
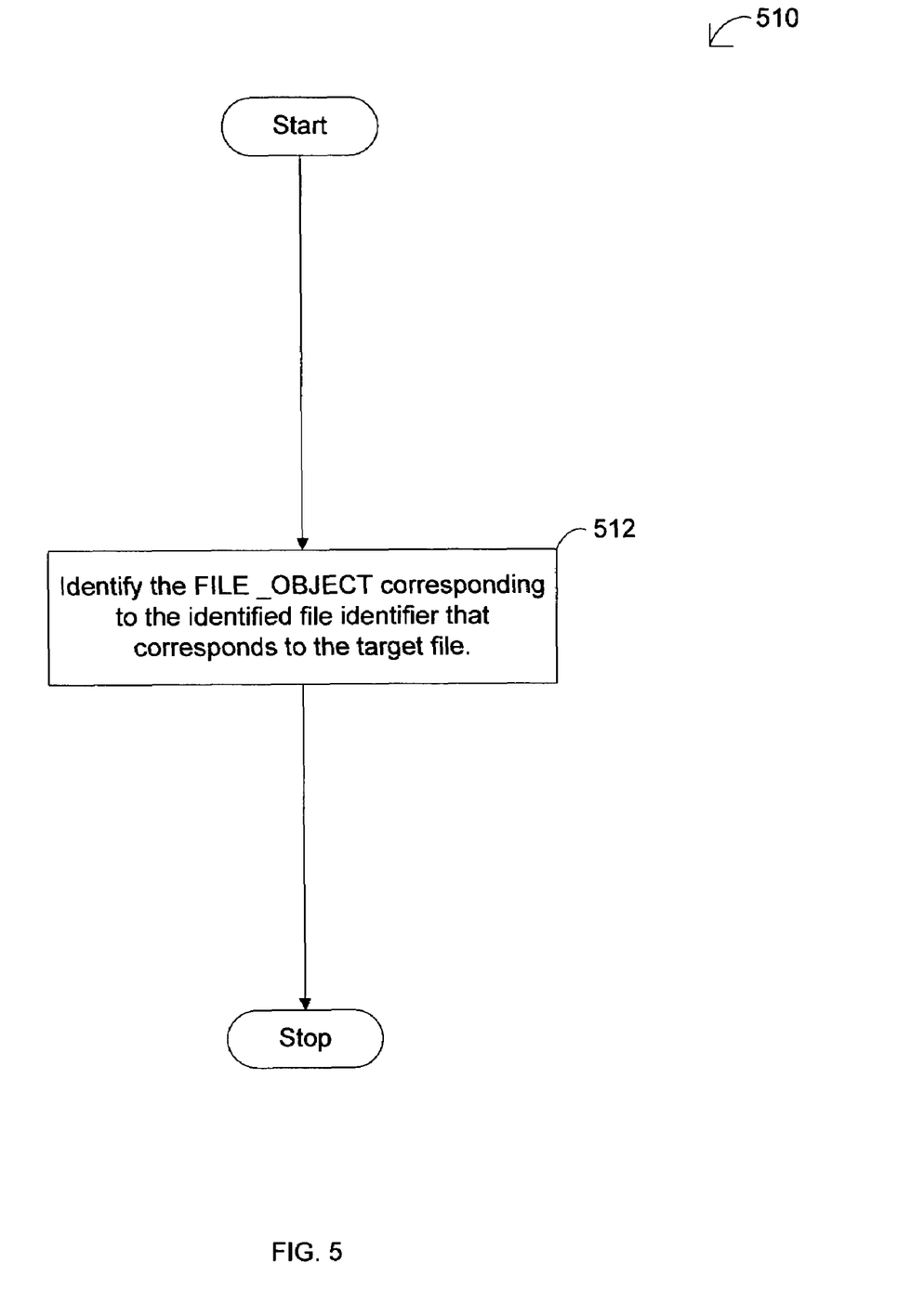
FIG. 5 is a flowchart of the identifying step in accordance with an exemplary embodiment of the present invention.

Referring to FIG. 5, in an exemplary embodiment, identifying step 214 includes a step 512 of identifying the FILE_OBJECT corresponding to the identified file identifier that corresponds to the target file.

Sending the Identified File Identifier to the Kernel

It should be possible to read directly using a handle in user space. However, this handle is still constrained by the permissions that the original locking process had placed upon it, and an attempted read on this handle generates a locking violation.

Thus, this FILE_OBJECT is passed back into the kernel program, and the kernel program is asked to read data from the file described by this FILE_OBJECT via a cache read.

Figure 6:
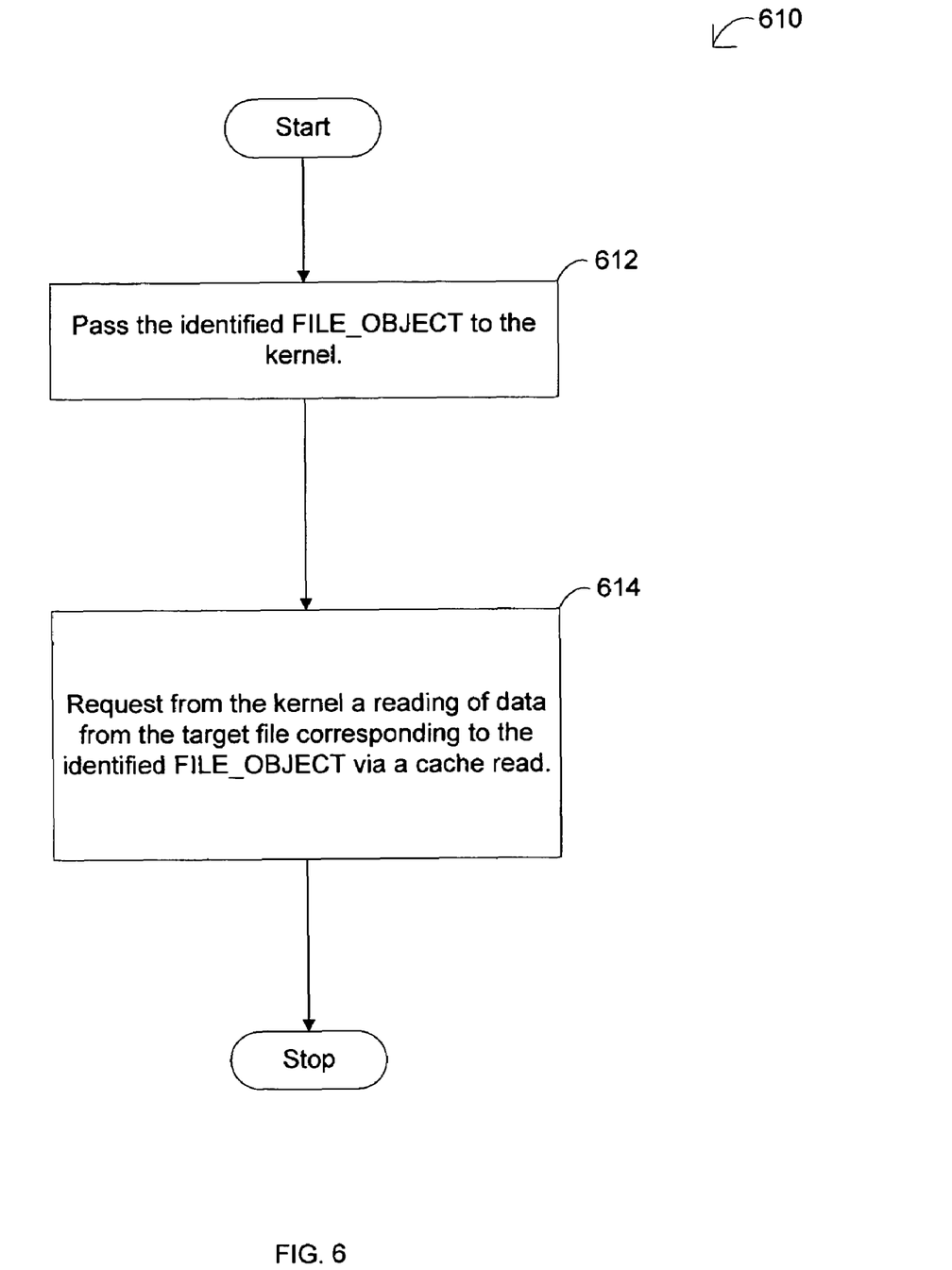
FIG. 6 is a flowchart of the sending step in accordance with an exemplary embodiment of the present invention.

Referring to FIG. 6, in an exemplary embodiment, sending step 216 includes a step 612 of passing the identified FILE_OBJECT to the kernel and a step 614 of requesting from the kernel a reading of data from the target file corresponding to the identified FILE_OBJECT via a cache read.

Initializing File Caching

Even by generating an IRP in the kernel and passing it down to the underlying filesystem (NTFS, FAT32, etc) that this file object resides on, like is done in co-pending, commonly-owned, and co-pending U.S. patent application Ser. No. (Number to be assigned), filed Dec. 15, 2003, it is still not possible to read the data. This method also generates a lock violation.

Instead, the present invention gets this data through the cache manager. First the kernel program checks the file object for an existing cache map. If it does not exist, it creates one using CcInitializeCacheMap.

Figure 7:
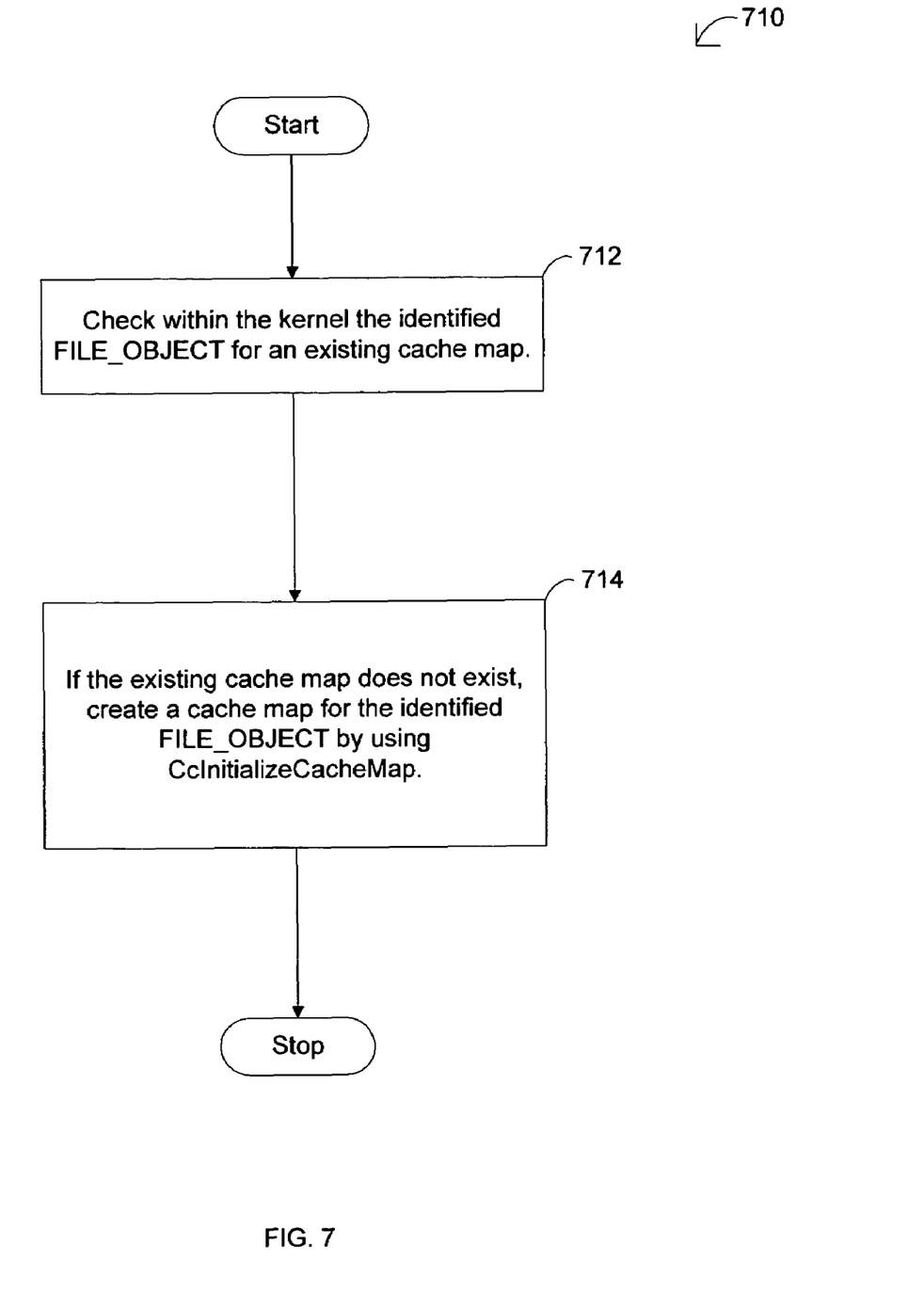
FIG. 7 is a flowchart of the initializing step in accordance with an exemplary embodiment of the present invention.

Referring to FIG. 7, in an exemplary embodiment, initializing step 218 includes a step 712 of checking within the kernel the identified FILE_OBJECT for an existing cache map and a step 714 of, if the existing cache map does not exist, creating a cache map for the identified FILE_OBJECT by using CcInitializeCacheMap.

Requesting a Region of the Target File

Once a valid kernel cache map for this file exists, a cache read is issued for this FILE_OBJECT through CcMdlRead.

Figure 8:
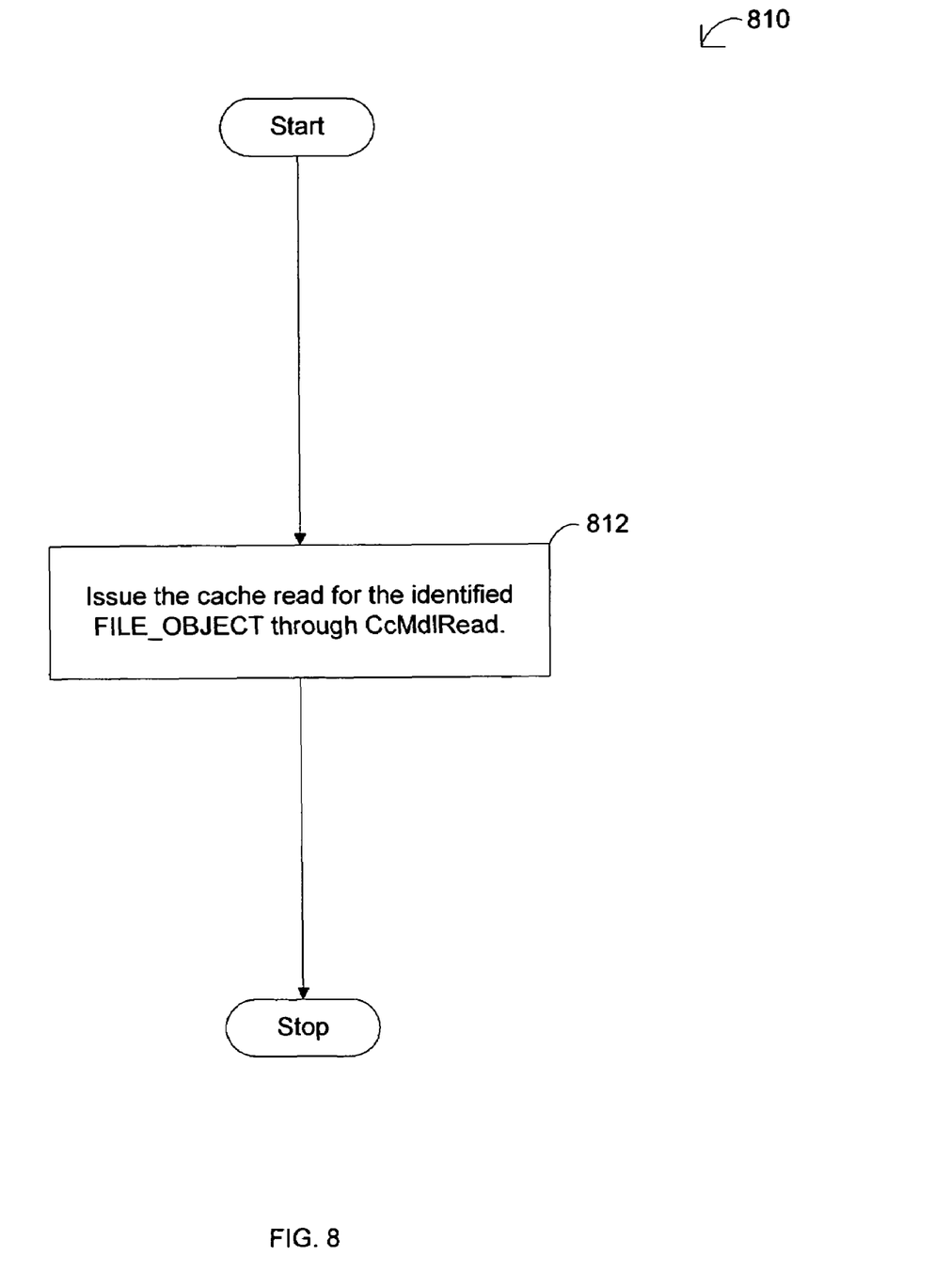
FIG. 8 is a flowchart of the requesting step in accordance with an exemplary embodiment of the present invention.

Referring to FIG. 8, in an exemplary embodiment, requesting step 220 includes a step 812 of issuing the cache read for the identified FILE_OBJECT through CcMdlRead.

Receiving Data Corresponds to the Target File

The cache manager responds with the requested data, and the kernel program passes that data back up to user space.

Figure 9:
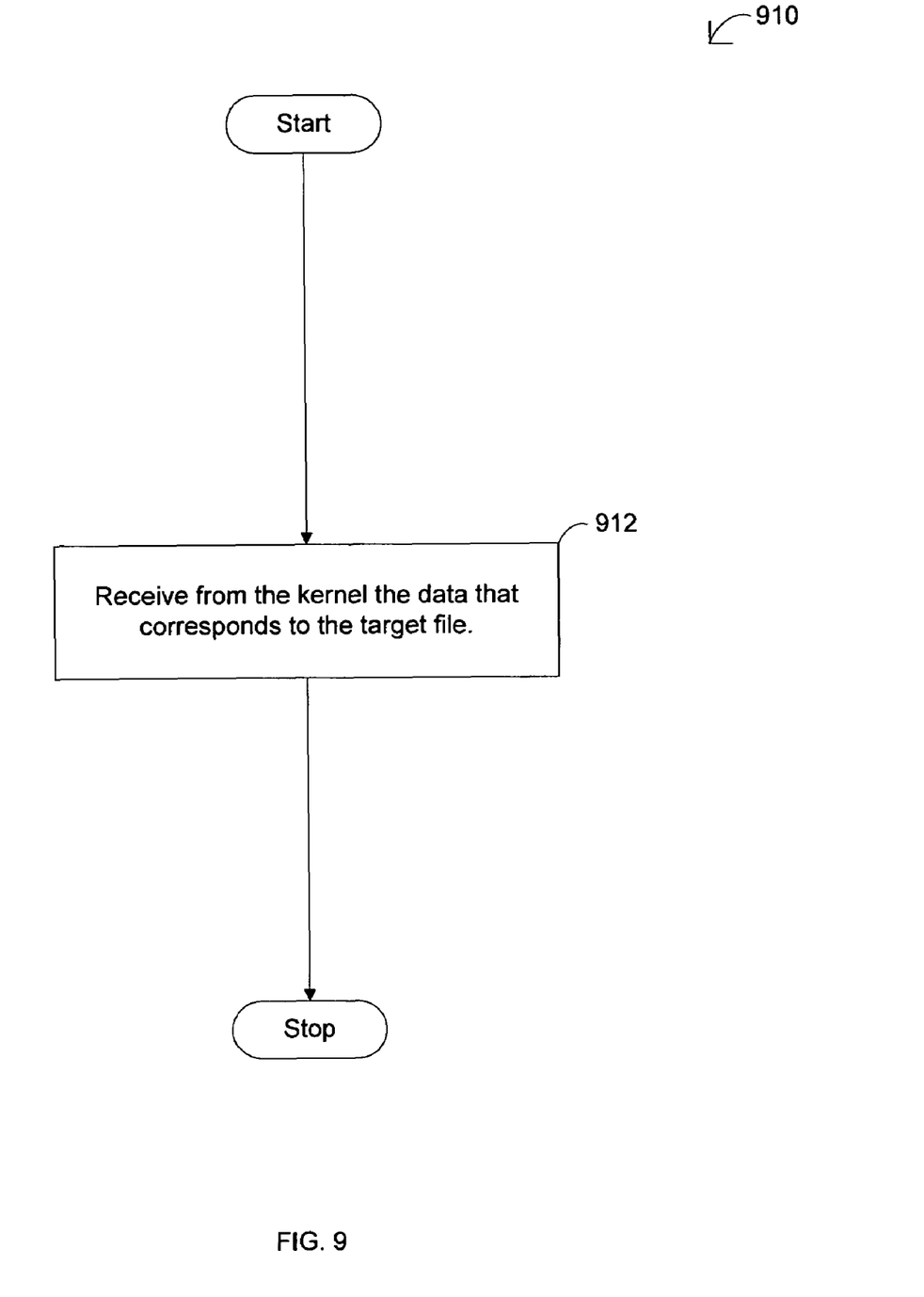
FIG. 9 is a flowchart of the receiving step in accordance with an exemplary embodiment of the present invention.

Referring to FIG. 9, in an exemplary embodiment, receiving step 222 includes a step 912 of receiving from the kernel the data that corresponds to the target file.

Conclusion

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of accessing at least one target file in a computer system with an operating system with file locking implemented with byte-range locking, the method comprising:

obtaining a set of handles that corresponds to a set of all files that are open in the computer system;

determining within the kernel of the operating system a set of file identifiers that corresponds to the set of handles;

identifying from the set of file identifiers a file identifier that corresponds to the target file;

sending the identified file identifier to the kernel;

requesting within the kernel, using the identified file identifier, a region of the target file from the file system driver of the operating system; and receiving data that corresponds to the target file.

2. The method of claim 1 wherein the obtaining comprises:

issuing an NtQuerySystemInformation to the kernel, wherein the NtQuerySystemInformation asks for all information about each handle in the set of handles; and obtaining from the kernel an array of SYSTEM_HANDLE_INFORMATION for each handle in the set of handles, wherein the SYSTEM_HANDLE_INFORMATION comprises a pointer to a FILE_OBJECT, wherein the FILE_OBJECT comprises file identifier information.

3. The method of claim 2 wherein the determining comprises:

for each handle in the set of handles, passing a pointer to the FILE_OBJECT corresponding to the each handle to the kernel.

4. The method of claim 3 wherein the determining further comprises:

for the each handle in the set of handles, outputting from within the kernel a file identifier corresponding to the passed FILE_OBJECT.

5. The method of claim 4 wherein the identifying comprises:

identifying the FILE_OBJECT corresponding to the identified file identifier that corresponds to the target file.

6. The method of claim 5 wherein the sending comprises:

passing the identified FILE_OBJECT to the kernel; and requesting from the kernel a reading of data from the target file corresponding to the identified FILE_OBJECT via a cache read.

7. The method of claim 6 wherein the initializing comprises:

checking within the kernel the identified FILE_OBJECT for an existing cache map; and if the existing cache map does not exist, creating a cache map for the identified FILE_OBJECT by using CcInitializeCacheMap.

8. The method of claim 7 wherein the requesting comprises:

issuing the cache read for the identified FILE_OBJECT through CcMdlRead.

9. The method of claim 8 wherein the receiving comprises:

receiving from the kernel the data that corresponds to the target file.

10. A programmable computer storing machine readable code that when executed accesses at least one target file, the machine readable code comprises:
- an obtaining module configured to obtain a set of handles that corresponds to a set of all files that are open in the computer system;
- a determining module configured to determine within the kernel of the operating system a set of file identifiers that corresponds to the set of handles;
- an identifying module configured to identify from the set of file identifiers a file identifier that corresponds to the target file;
- a sending module configured to send the identified file identifier to the kernel;
- a requesting module configured to request a region of the target file from the file system driver of the operating system; and
- a receiving module configured to receive data that corresponds to the target file.

11. The programmable computer of claim 10 wherein the obtaining module comprises:
- an issuing module configured to issue an NtQuerySystemInformation to the kernel, wherein the NtQuerySystemInformation asks for all information about each handle in the set of handles; and
- an obtaining module configured to obtain from the kernel an array of SYSTEM_HANDLE_INFORMATION-N for each handle in the set of handles, wherein the SYSTEM_HANDLE_INFORMATION comprises a pointer to a FILE_OBJECT, wherein the FILE_OBJECT comprises file identifier information.

12. The programmable computer of claim 11 wherein the determining module comprises:
- for each handle in the set of handles, a passing module configured to pass a pointer to the FILE_OBJECT corresponding to the each handle to the kernel.

13. The programmable computer of claim 12 wherein the determining module further comprises:
- for the each handle in the set of handles, an outputting module configured to output from within the kernel a file identifier corresponding to the passed FILE_OBJECT.

14. The programmable computer of claim 13 wherein the identifying module comprises:
- an identifying module configured to identify the FILE_OBJECT corresponding to the identified file identifier that corresponds to the target file.

15. The programmable computer of claim 14 wherein the sending module comprises:
- a passing module configured to pass the identified FILE_OBJECT to the kernel; and
- a requesting module configured to request from the kernel a reading of data from the target file corresponding to the identified FILE_OBJECT via a cache read.

16. The programmable computer of claim 15 wherein the initializing module comprises:
- a checking module configured to check within the kernel the identified FILE_OBJECT for an existing cache map; and
- if the existing cache map does not exist, a creating module configured to create a cache map for the identified FILE_OBJECT by using CcInitializeCacheMap.

17. The programmable computer of claim 16 wherein the requesting module comprises:
- an issuing module configured to issue the cache read for the identified FILE_OBJECT through CcMdlRead.

18. The programmable computer of claim 17 wherein the receiving module comprises:
- a receiving module configured to receive from the kernel the data that corresponds to the target file.

19. A method of accessing at least one target file in a computer system with an operating system with file locking implemented with byte-range locking, the method comprising:
- obtaining a set of handles that corresponds to a set of all files that are open in the computer system;
- determining within the kernel of the operating system a set of file identifiers that corresponds to the set of handles;
- identifying from the set of file identifiers a file identifier that corresponds to the target file;
- sending the identified file identifier to the kernel; and
- requesting, using the identified file identifier, a region of the target file from the file system driver of the operating system.

20. The method of claim 19 wherein the obtaining comprises:
- issuing an NtQuerySystemInformation to the kernel, wherein the NtQuerySystemInformation asks for all information about each handle in the set of handles; and
- obtaining from the kernel an array of SYSTEM_HANDLE_INFORMATION for each handle in the set of handles, wherein the SYSTEM_HANDLE_INFORMATION comprises a pointer to a FILE_OBJECT, wherein the FILE_OBJECT comprises file identifier information.

21. The method of claim 20 wherein the determining comprises:
- for each handle in the set of handles, passing a pointer to the FILE_OBJECT corresponding to the each handle to the kernel.

22. The method of claim 21 wherein the determining further comprises:
- for the each handle in the set of handles, outputting from within the kernel a file identifier corresponding to the passed FILE_OBJECT.

23. The method of claim 22 wherein the identifying comprises:
- identifying the FILE_OBJECT corresponding to the identified file identifier that corresponds to the target file.

24. The method of claim 23 wherein the sending comprises:
- passing the identified FILE_OBJECT to the kernel; and
- requesting from the kernel a reading of data from the target file corresponding to the identified FILE_OBJECT via a cache read.

25. The method of claim 24 wherein the initializing comprises:
- checking within the kernel the identified FILE_OBJECT for an existing cache map; and
- if the existing cache map does not exist, creating a cache map for the identified FILE_OBJECT by using CcInitializeCacheMap.

26. The method of claim 25 wherein the requesting comprises:
- issuing the cache read for the identified FILE_OBJECT through CcMdlRead.

27. A programmable computer storing machine readable code that when executed accesses at least one target file, the machine readable code comprises:
- an obtaining module configured to obtain a set of handles that corresponds to a set of all files that are open in the computer system;

a determining module configured to determine within the kernel of the operating system a set of file identifiers that corresponds to the set of handles;

an identifying module configured to identify from the set of file identifiers a file identifier that corresponds to the target file; a sending module configured to send the identified file identifier to the kernel; and a requesting module configured to request a region of the target file from the file system driver of the operating system.

28. The programmable computer of claim 27 wherein the obtaining module comprises:

an issuing module configured to issue an NtQuerySystemInformation to the kernel, wherein the NtQuerySystemInformation asks for all information about each handle in the set of handles; and an obtaining module configured to obtain from the kernel an array of SYSTEM_HANDLE_INFORMATION-N for each handle in the set of handles, wherein the SYSTEM_HANDLE_INFORMATION comprises a pointer to a FILE_OBJECT, wherein the FILE_OBJECT comprises file identifier information.

29. The programmable computer of claim 28 wherein the determining module comprises:

for each handle in the set of handles, a passing module configured to pass a pointer to the FLE_OBJECT corresponding to the each handle to the kernel.

30. The programmable computer of claim 29 wherein the determining module further comprises:

for the each handle in the set of handles, an outputting module configured to output from within the kernel a file identifier corresponding to the passed FILE_OBJECT.

31. The programmable computer of claim 30 wherein the identifying module comprises:

an identifying module configured to identify the FILE_OBJECT corresponding to the identified file identifier that corresponds to the target file.

32. The programmable computer of claim 31 wherein the sending module comprises:

a passing module configured to pass the identified FILE_OBJECT to the kernel; and a requesting module configured to request from the kernel a reading of data from the target file corresponding to the identified FILE_OBJECT via a cache read.

33. The programmable computer of claim 32 wherein the initializing module comprises:

a checking module configured to check within the kernel the identified FILE_OBJECT for an existing cache map; and if the existing cache map does not exist, a creating module configured to create a cache map for the identified FILE_OBJECT by using CcInitializeCacheMap.

34. The programmable computer of claim 33 wherein the requesting module comprises:

an issuing module configured to issue the cache read for the identified FILE_OBJECT through CcMdlRead.

35. A programmable computer storing machine readable code that when executed accesses at least one target file in a computer system with an operating system with file locking implemented with byte-range locking, the programmable computer comprising:

computer readable code for obtaining a set of handles that corresponds to a set of all files that are open in the computer system;

computer readable code for determining within the kernel of the operating system a set of file identifiers that corresponds to the set of handles;

computer readable code for identifying from the set of file identifiers a file identifier that corresponds to the target file;

computer readable code for sending the identified file identifier to the kernel;

computer readable code for requesting a region of the target file from the file system driver of the operating system; and computer readable code for receiving data that corresponds to the target file.

36. A programmable computer storing machine readable code that when executed accesses at least one target file in a computer system with an operating system with file locking implemented with byte-range locking, the programmable computer comprising:

computer readable code for obtaining a set of handles that corresponds to a set of all files that are open in the computer system;

computer readable code for determining within the kernel of the operating system a set of file identifiers that corresponds to the set of handles;

computer readable code for identifying from the set of file identifiers a file identifier that corresponds to the target file;

computer readable code for sending the identified file identifier to the kernel; and computer readable code for requesting a region of the target file from the file system driver of the operating system.

* * * * *